March 25, 1924.
T. A. BIGGS ET AL
1,488,459
TRAVELING COPY FOR TYPISTS
Filed July 20, 1922      2 Sheets-Sheet 1
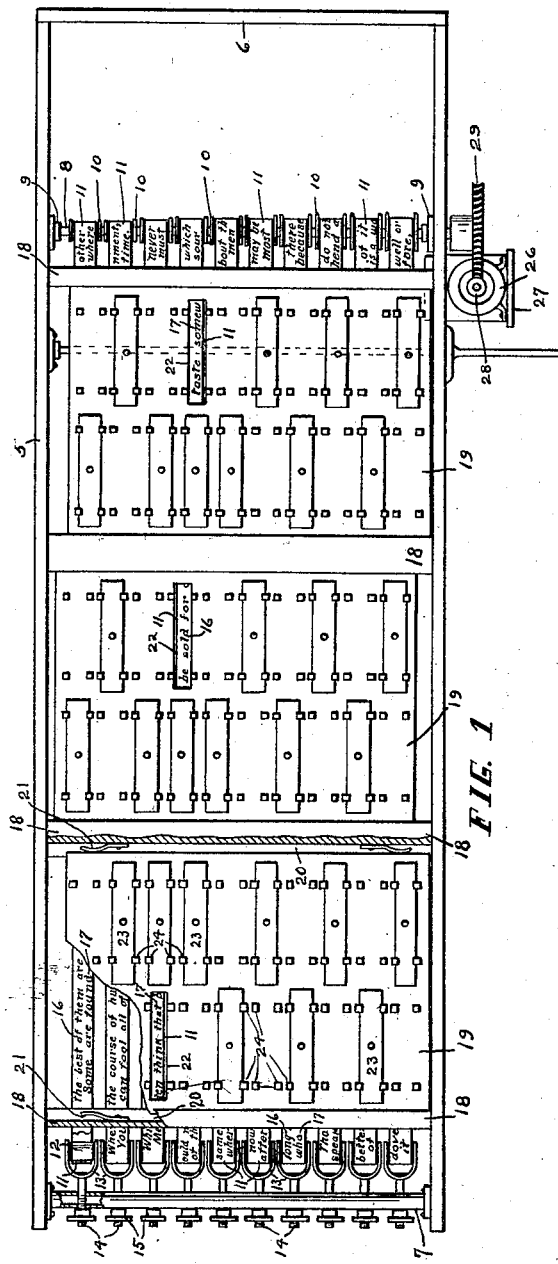
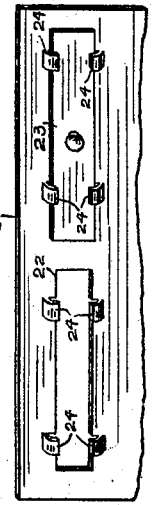
INVENTOR.
T. A. BIGGS
A. E. VANCE
BY
Milton S. Crandall
ATTORNEYS.

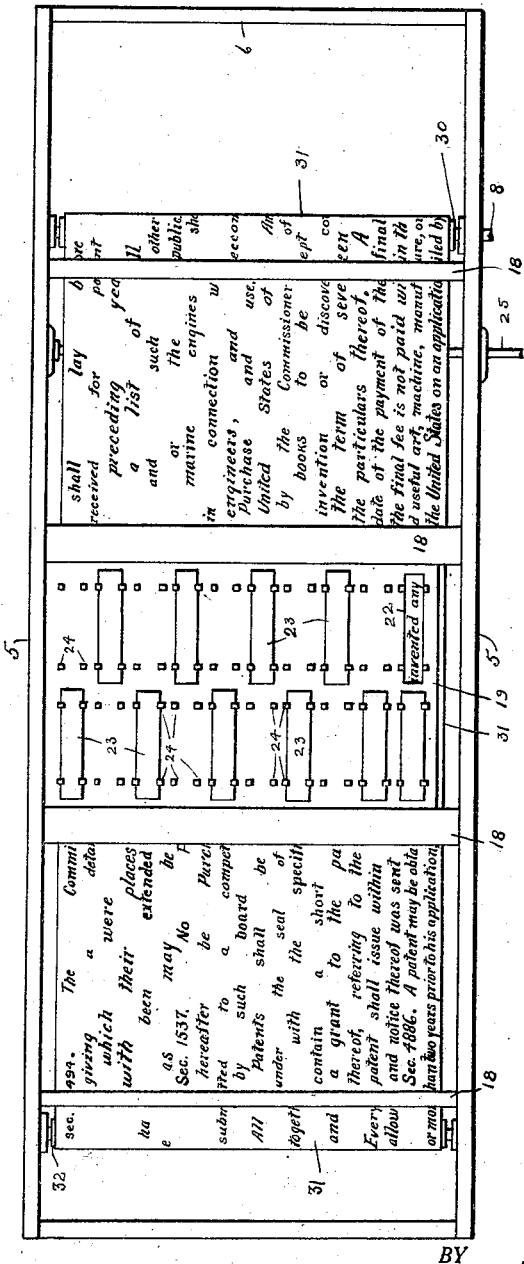

Patented Mar. 25, 1924.

1,488,459

UNITED STATES PATENT OFFICE.

THOMAS A. BIGGS, OF SIOUX CITY, IOWA, AND ANDREW E. VANCE, OF LONG BEACH, CALIFORNIA.

TRAVELING COPY FOR TYPISTS.

Application filed July 20, 1922. Serial No. 576,402.

*To all whom it may concern:*

Be it known that we, THOMAS A. BIGGS and ANDREW E. VANCE, citizens of the United States, and residents of Sioux City, in the county of Woodbury and State of Iowa, and Long Beach, in the county of Los Angeles and State of California, have invented certain new and useful Improvements in Traveling Copies for Typists, of which the following is a specification.

Our invention provides an improved moving copy device for student typists embodying certain novel characteristics and features of construction which facilitate learning the so-called touch system of typewriting.

Another object of the invention is the production of a device of this class providing copies for the student which move at gradually varying speeds whereby the student is required to copy faster as she or he gains speed and accuracy.

Furthermore, the invention has for an object the production of a device of this sort, which is exceedingly simple and inexpensive in construction, yet stable and thoroughly efficient in operation.

The above and other objects and advantages we successfully attain in the embodiments hereinafter described, defined in the appended claims and illustrated in the accompanying drawings in which like characters of reference indicate corresponding parts throughout the several views, of which,—

Fig. 1 is a front elevation of a device constructed in accordance with the invention, parts being cut away and shown in section.

Fig. 2 is a fragmentary, enlarged, perspective view of one of the screen members.

Fig. 3 is a similar view of one of the belt-tightening elements, and

Fig. 4 is a fragmentary, front elevation of a modified form of the device.

Referring, now, more particularly to Sheet 1 of the drawings, the device includes a suitable superstructure, preferably consisting of a rectangular frame having upper and lower horizontal bars, 5, and suitable upright end members, 6 and 7. At one end of the frame is an upright drive-shaft, 8, journaled in suitable bearings, 9, on the frame and having mounted thereon drive pulleys, 10, connected by belts, 11, with idler pulleys, 12, suitably mounted at the opposite ends of the frame. The pulleys, 12, are preferably carried by yokes, 13, on bolts, 14, projecting through the frame member, 7, and having on their outer end portion, nuts, 15, engageable with the said upright, whereby the belts may be tightened by turning the nuts in the appropriate direction. The drive pulleys, 10, are of gradually varying diameters with respect to their arrangement on the shaft, 8, whereby the belts are driven at different speeds. On the belts are lines of printed elements, as letters, syllables, words or numerals, which the students are required to copy, as will be more fully explained.

In the present embodiment we provide each belt with two such printed lines, 16 and 17, respectively. The copy is screened from the vision of the students by suitable means having windows past which the copy travels, successively revealing a limited number of the printed elements of each line. The screening means preferably includes upright bars, 18, between which are supported sheet metal plates, 19, the side portions of which are slidably disposed within grooves, 20, in the bars, 18, within which grooves the bars are provided with leaf springs, 21, which impinge the edges of the plates, 19, to hold them against precipitation when they are raised. The plates, 19, are each provided with windows for the respective belts, 11, each window preferably consisting of an elongated, horizontal opening, 22, sufficiently wide to expose but one line of the copy and sufficiently short to expose but a limited number of the printed elements. The windows of each screen member, 19, are preferably alternately arranged in two vertical rows. Removable covers are provided for the respective openings, which may consist of sheet metal plates, 23, slidable over and from the windows between the screens, 19, and guide-clips or ears, 24, sheared and pressed outwardly from the elements, 19.

The frame is supported in any suitable manner, preferably on an extensible standard, 25, adapted to rest on the floor.

The drive-shaft, 8, is actuated from any suitable source of power, as by an electric motor, 26, mounted on a suitable bracket, 27, on the frame; and having fixed on its spindle a worm, 28, driving a worm wheel, 29, fixed on the shaft, 8.

The preferred embodiment is designed for three student typists, who are positioned, respectively before the screens, 19. The students are first required to copy from the upper or slowest moving belt, and as they gain speed and proficiency the lines of the other belts are successively exposed for their copying.

When the screens are in their normal or lower positions, the windows reveal the lower lines of copy on the belts, and when the screens are moved upwardly, as the intermediate screen in Fig. 1, the windows expose the upper lines on the belts.

Substantially the same results are obtained by the modification presented in Fig. 4, wherein the same superstructure and drive-shaft may be employed, the drive-shaft having fixed thereon a drive roller, 30, connected by a broad belt, 31, with an idler roller, 32, suitably mounted at the opposite end of the frame. The modification is equipped with the same screen mechanism as disclosed in the preferred form, and further description thereof is thought unnecessary. Upon the belts are printed the lines of copy, the printed elements of the successive lines of which are spaced differently; that is, the words of the upper line are spaced slightly further apart than those of the second line and in each succeeding line the words are closer together until in the lower line the words are only slightly spaced. By virtue of this arrangement it is clear that the words of each line appear more frequently through the associated window of the screen than those of the preceding line.

Having thus described our invention, what we claim as new and desire to secure by Letters Patent of the United States, is:—

1. A device of the class described comprising a copy means including a plurality of lines of printed elements, and screening means for concealing said elements and adapted at determinate points to reveal a limited number of said elements, one of said means being movable with respect to the other longitudinally of the lines, whereby the printed elements are successively revealed, said copy means and screening means being so constructed, arranged and related that the printed elements of each line will be revealed at intervals of time different from those of the other lines.

2. A device of the class described comprising longitudinally moving rows of spaced visible elements, and a screen therebefore having windows through which said elements are successively revealed, said rows being moved continuously but each at a speed different from the others.

3. A device of the class described comprising screening means having windows, and mechanism in the rear thereof including an endless driven means and a plurality of lines of printed elements thereon revealed successively through the windows, the elements of each line being revealed at intervals of time different from those of the other lines.

4. A device of the class described embodying a plurality of parallel belts, lines of printed elements thereon, pulleys for the belts, and screening means to conceal said elements and having windows through which a limited number of the elements of each line are successively revealed, and means for driving the belts each at a different speed than the others.

5. A device of the class described embodying a plurality of parallel belts, lines of printed elements thereon, pulleys for the belts, screening means to conceal said elements and having windows through which a limited number of the elements of each line are successively revealed, and means for driving the belts each at a different speed than the others, and removable coverings for the windows.

In testimony whereof, we have hereunto set our hands this 11th day of July, 1922.

THOMAS A. BIGGS.
ANDREW E. VANCE.